(12) United States Patent
Campbell et al.

(10) Patent No.: US 9,041,384 B2
(45) Date of Patent: May 26, 2015

(54) SENSORS FOR HIGH-TEMPERATURE ENVIRONMENTS AND METHOD FOR ASSEMBLING SAME

(75) Inventors: Lam Arthur Campbell, Minden, NV (US); Vinayak Tilak, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1099 days.

(21) Appl. No.: 13/069,509

(22) Filed: Mar. 23, 2011

(65) Prior Publication Data

US 2012/0243182 A1     Sep. 27, 2012

(51) Int. Cl.
*G01R 1/04*     (2006.01)
*G01D 11/24*    (2006.01)

(52) U.S. Cl.
CPC ................................ *G01D 11/245* (2013.01)

(58) Field of Classification Search
CPC ....... G01D 11/24; G01D 11/245; H05K 7/00; H05K 13/04; G01R 31/00–31/002
See application file for complete search history.

(56) References Cited

U.S. PATENT DOCUMENTS

| 5,801,422 | A  | * | 9/1998  | Rostoker et al. ............. 257/369 |
| 7,017,662 | B2 |   | 3/2006  | Schultz et al. |
| 7,036,378 | B2 | * | 5/2006  | Levinzon ........................ 73/654 |
| 7,164,995 | B2 | * | 1/2007  | Pollock et al. .................. 702/57 |
| 7,301,223 | B2 |   | 11/2007 | Rodney et al. |
| 7,610,813 | B2 | * | 11/2009 | Hughes et al. .................. 73/777 |

* cited by examiner

*Primary Examiner* — Vinh Nguyen
(74) *Attorney, Agent, or Firm* — Fletcher Yoder P.C.

(57) ABSTRACT

A sensor assembly includes an outer housing and at least one high-impedance sensing device positioned within the outer housing. The sensor assembly also includes a buffering circuit having at least one wide bandgap semiconductor device positioned within the outer housing. The buffering circuit is operatively coupled to the at least one high-impedance sensing device.

17 Claims, 5 Drawing Sheets

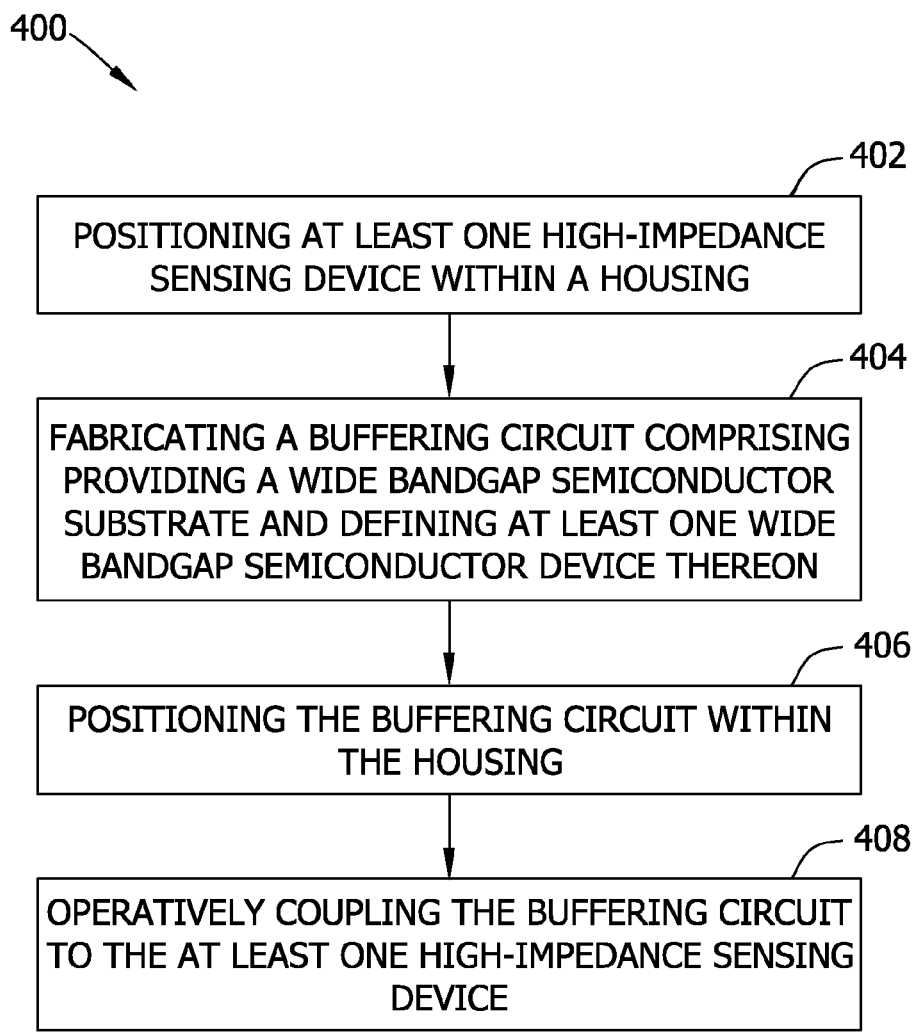

SENSORS FOR HIGH-TEMPERATURE ENVIRONMENTS AND METHOD FOR ASSEMBLING SAME

BACKGROUND OF THE INVENTION

The subject matter described herein relates generally to sensors and, more particularly, to sensors for high-temperature environments and methods for assembling the same.

At least some known high-impedance sensor assemblies include sensing elements manufactured for high-temperature environments up to and exceeding approximately 225 degrees Celsius (° C.) (437 degrees Fahrenheit (° F.)). However, known electronic devices coupled in communication with these known sensing elements may not operate consistently and reliably in environments with temperatures above approximately 225° C. (437° F.). Many industrial applications include environments with temperatures ranging from about −55° C. (−67° F.) to about 600° C. (1112° F.) substantially continuously, i.e., for exposure periods over an extended period of time, e.g., exceeding approximately 5,000 hours. Therefore known high-temperature, high-impedance sensor assemblies require special adaptive equipment to facilitate operating with a desired signal-to-noise ratio (SNR) and survivability in rugged, high-temperature environments, up to, and exceeding, approximately 225° C. (437° F.).

Such special adaptive equipment may include use of auxiliary cooling devices to facilitate operating electronic devices within the sensor assemblies in high temperature environments at and/or above approximately 225° C. (437° F.). Such auxiliary cooling devices may include heat exchange devices, e.g., cooling coils coupled to a fluid coolant system. However, these auxiliary cooling devices increase the costs of assembling the sensor assemblies and add another potential point of failure to such assemblies. Moreover, the size and/or weight of the auxiliary cooling devices are often prohibitive.

Also, such special adaptive equipment may include mineral insulated (MI) cable which facilitates operative connectivity with devices that receive signals transmitted from the sensing elements. However, while such MI cable is more sturdy and robust than standard shielded cable, and is therefore sometimes referred to as "hardline cable", MI cable is more costly to purchase than standard shielded cable. Also, due to the sturdiness of the cable, MI cable is difficult to bend and is difficult to route through industrial facilities, requiring special tooling, thereby further increasing installation costs. Furthermore, for high-temperature environments of approximately 225° C. (437° F.) or above, the electronic devices are separated from the sensing elements. In such situations, the electronic devices may be positioned a significant distance from the sensing elements, thereby further increasing the costs of installation and possibly adversely affecting operating reliability due to unforeseen cable failures and increased susceptibility to noise therein.

BRIEF DESCRIPTION OF THE INVENTION

In one aspect, a sensor assembly is provided. The sensor assembly includes an outer housing and at least one high-impedance sensing device positioned within the outer housing. The sensor assembly also includes a buffering circuit comprising at least one wide bandgap semiconductor device positioned within the outer housing. The buffering circuit is operatively coupled to the at least one high-impedance sensing device.

In another aspect, a method for assembling a sensor assembly is provided. The method includes positioning at least one high-impedance sensing device within a housing. The method also includes fabricating a buffering circuit including providing a wide bandgap semiconductor substrate and defining at least one wide bandgap semiconductor device thereon. The method also includes positioning the buffering circuit within the housing. The method further includes operatively coupling the buffering circuit to the least one high-impedance sensing device.

In yet another aspect, a data acquisition system (DAS) is provided. The DAS includes at least one DAS cabinet and at least one input/output (I/O) terminal strip coupled in communication with the at least one DAS cabinet. The DAS also includes a plurality of sensor assemblies. Each sensor assembly of the plurality of sensor assemblies includes an outer housing and at least one high-impedance sensing device positioned within the outer housing. Each sensor assembly of the plurality of sensor assemblies also includes a buffering circuit including at least one wide bandgap semiconductor device positioned within the outer housing. The buffering circuit is operatively coupled to the at least one high-impedance sensing device.

BRIEF DESCRIPTION OF THE DRAWINGS

The embodiments described herein may be better understood by referring to the following description in conjunction with the accompanying drawings.

FIG. 5 is a flowchart of an exemplary method of assembling the sensor assembly shown in FIG. 2.

DETAILED DESCRIPTION OF THE INVENTION

Figure 1:
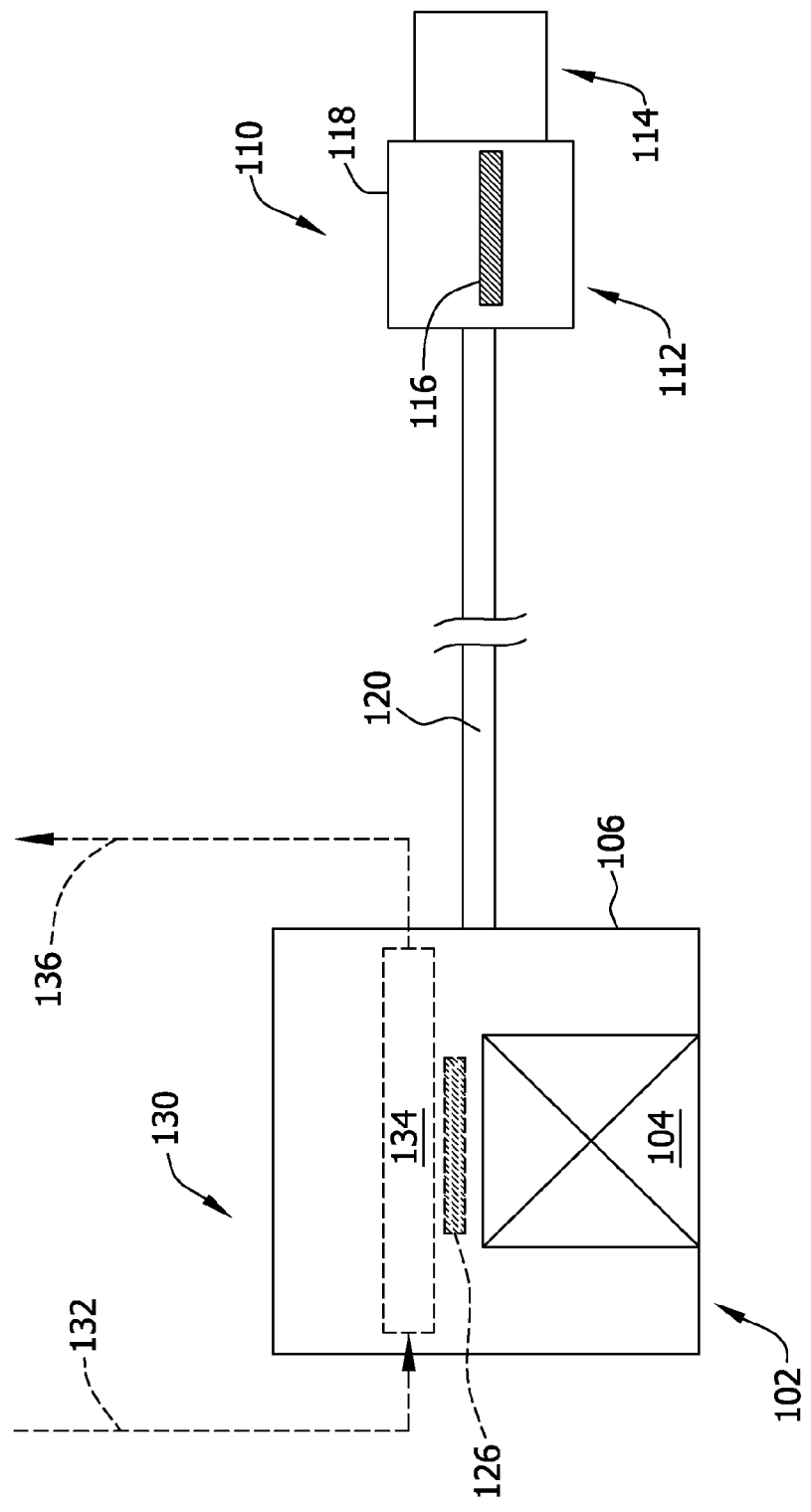
FIG. 1 is a schematic view of a prior art sensor assembly.

FIG. 1 is a schematic view of a prior art sensor assembly 100. Sensor assembly 100 includes a sensor portion 102. Sensor portion 102 includes a sensor 104 positioned within an outer housing 106. Sensor assembly 100 also includes an electronics subassembly 110. Electronics subassembly 110 includes an electronics section 112 and a connector section 114. Electronics section 112 includes electronic devices 116 within a housing 118. Electronic devices 116 condition signals received from sensor 104 for further transmission via connector section 114 to other devices (not shown). Sensor assembly 100 further includes a mineral insulated (MI) cable 120 coupling outer housing 106 to electronics subassembly 110. MI cable 120 has any length that facilitates positioning electronic devices 116 in non-high-temperature environments, i.e., environments that have temperatures less than approximately 225° C. (437° F.).

Some embodiments of prior art sensor assembly 100 may include electronic devices 126 (shown in phantom) positioned within outer housing 106. In these embodiments, sensor assembly 100 may not include electronics section 112 and MI cable 120, and connector section 114 is coupled directly to outer housing 106. Moreover, for those situations that include positioning outer housing 106, including electronic devices 126, in environments that include temperatures approximate to or above approximately 225° C. (437° F.), a heat removal system 130 (shown in phantom) is coupled to outer housing 106. Heat removal system 130 includes a heat removal fluid inlet conduit 132, a heat transfer device 134, e.g., cooling coils, and a heat removal fluid outlet conduit 136. Heat transfer device 134 is positioned proximate to electronic devices 126 to facilitate maintaining devices 126 at less than approximately 225° C. (437° F.), i.e., at temperatures of approximately 125° C. (257° F.).

In operation, outer housing 106 is coupled to, or positioned in close proximity to, a measured variable. Such variables may include pressure, temperature, and/or flow. Sensor 104 generates and transmits signals representative of those measured variables to electronic devices 116 via MI cable 120. Electronics devices 116 condition the signal received from sensor 104 and transmit a conditioned signal to connector section 114 for further transmission to other devices and systems (neither shown). In some embodiments, sensor 104 transmits signals to electronic devices 126. In those embodiments, heat removal fluid (not shown) is channeled through fluid inlet conduit 132, heat transfer device 134, and fluid outlet conduit 136 such that the temperature of electronic devices 126 is maintained less than approximately 225° C. (437° F.).

Figure 2:
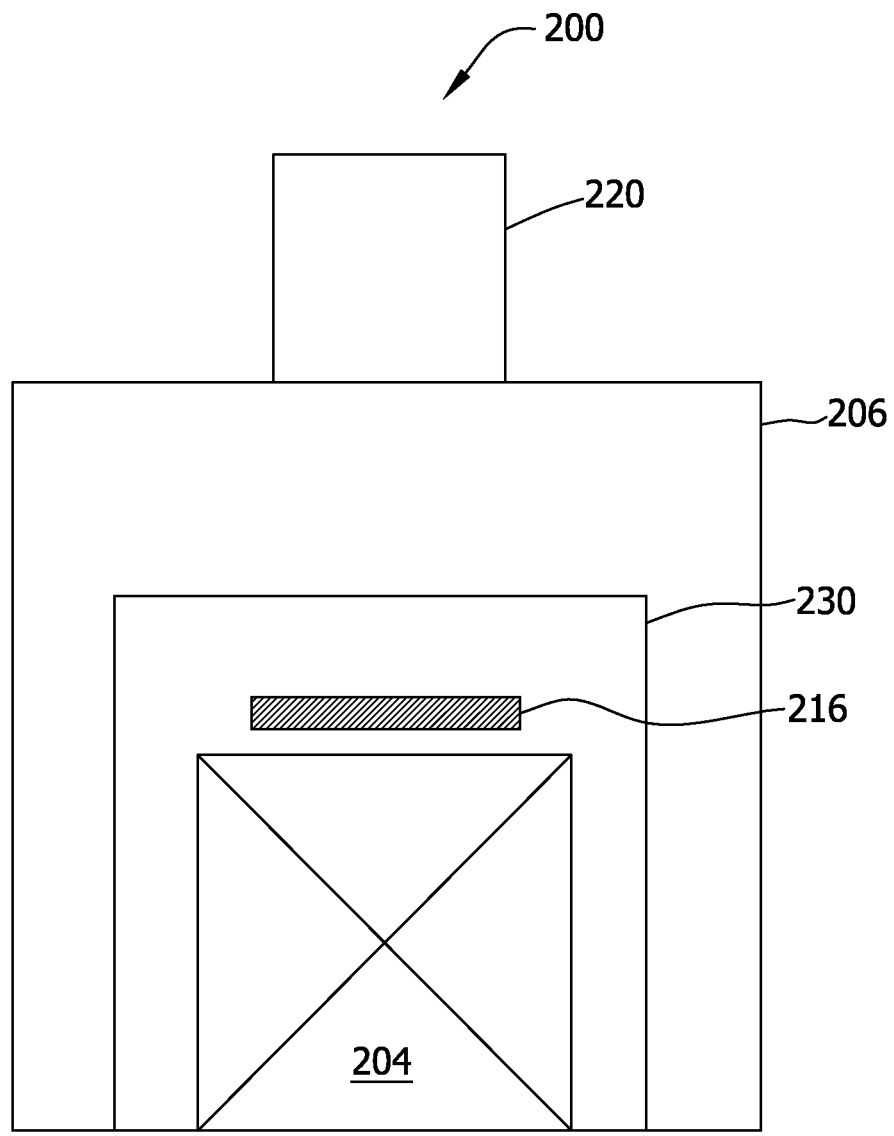
FIG. 2 is a schematic view of an exemplary sensor assembly.

FIG. 2 is a schematic view of an exemplary sensor assembly 200. In the exemplary embodiment, sensor assembly 200 includes a sensing device, or sensor 204 positioned within an outer housing 206. Also, in the exemplary embodiment, sensor 204 is a high-impedance device including, without limitation, a piezoelectric device and/or a photodiode. Outer housing 206 is coupled to, or positioned in close proximity to, an apparatus with measured variables. In the exemplary embodiment, outer housing 206 is configured for coupling to apparatus that may include, without limitation, gas turbines, steam turbines, gasification facilities, heat recovery steam generators, and heat exchangers (none shown). Such measured variables may include, without limitation, displacement, velocity, and acceleration of selected components, e.g., turbine shafts, using any one of proximity sensors, velocity sensors, and accelerometers (none shown). Alternatively, such apparatus and measured variables may include, without limitation, velocity and acceleration of exploratory shafts for deep oil wells (neither shown). Sensor assembly 200 also includes electronic devices 216 operatively coupled to sensor 204, wherein both devices 216 and sensor 204 are positioned within housing 206. Sensor assembly 200 further includes a connector section 220 operatively coupled to electronic devices 216 and other devices and systems (not shown in FIG. 2). Sensor assembly 200 also includes shielding 230 extending about electronic devices 216 and sensor 204. Shielding 230 provides electromagnetic interference (EMI) resistance and facilitates attaining a desired signal-to-noise (SNR) ratio with respect to the signals transmitted from sensor 204 to connector section 220 via electronic devices 216. Shielding 230 is electrically grounded and may be referenced to sensor 204 and electronic devices 216. Moreover, use of MI cable is substantially eliminated.

Figure 3:
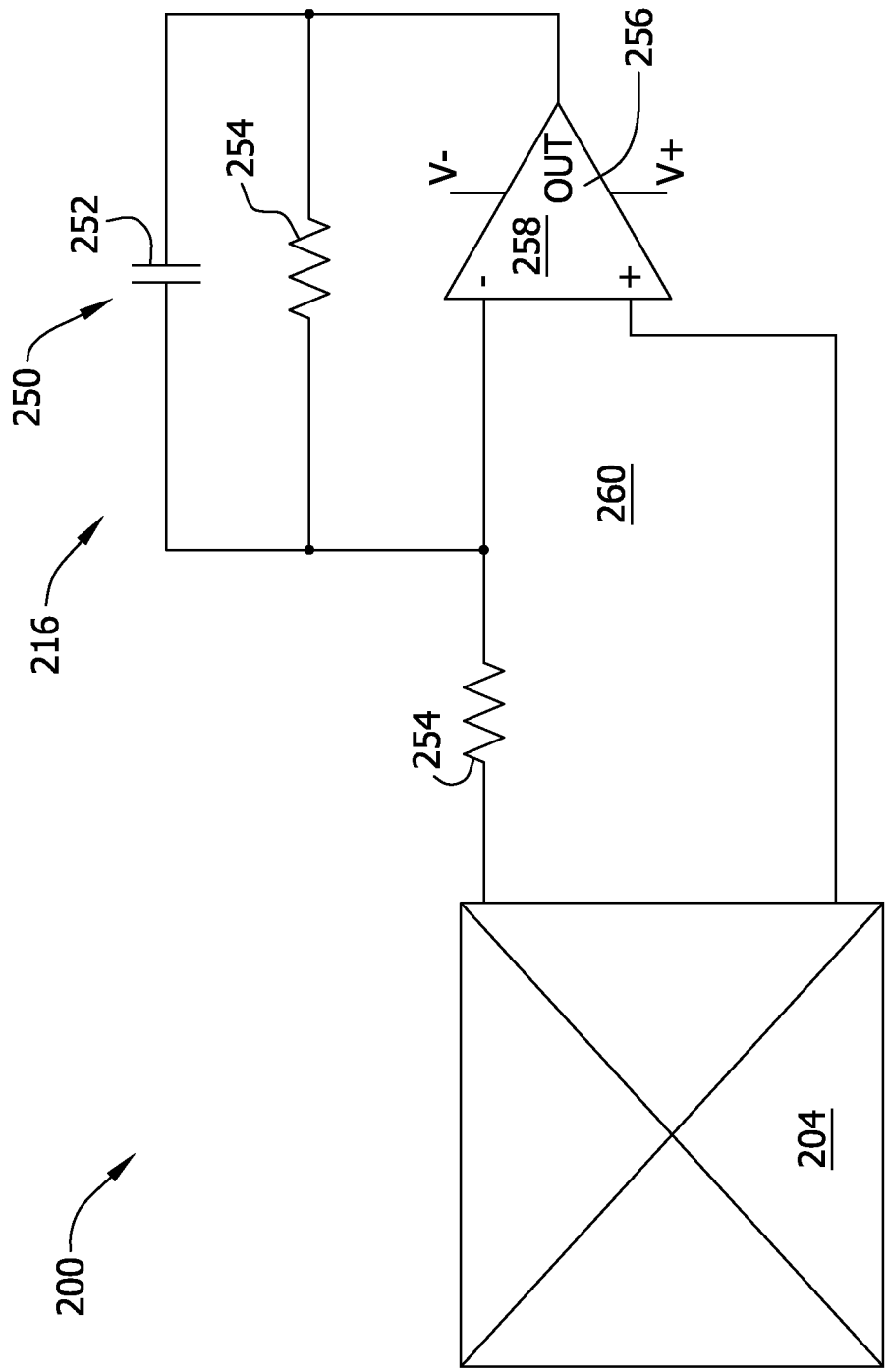
FIG. 3 is a schematic view of an electronics package that may be used with the sensor assembly shown in FIG. 2.

FIG. 3 is a schematic view of electronic devices 216 that may be used with the sensor assembly 200. Electronic devices 216 include a conditioning, or buffering circuit 250 operatively coupled to sensor 204. Buffering circuit 250 conditions signals received from sensor 204 for further transmission via connector section 220 to other devices (not shown in FIG. 3). In the exemplary embodiment, buffering circuit 250 includes any devices that enable operation of sensor assembly 200 as described herein including, without limitation, NPO-type ceramic dielectric capacitors 252 and film-based resistors 254. Also, in the exemplary embodiment, buffering circuit 250 includes at least one operational amplifier 256, wherein operational amplifier 256 is a wide bandgap semiconductor device. As used herein, the term wide bandgap semiconductor describes semiconductor materials with electronic band gaps in excess of approximately 1 to 2 electron volts (eV). Further, in the exemplary embodiment, silicon carbide (SiC) is the wide bandgap semiconductor material that forms a substrate 258 of operational amplifier 256. Alternatively, any wide bandgap semiconductor material may be used to form substrate 258 including, without limitation, alumina, gallium nitride (GaN), aluminum nitride (AlN), indium nitride (InN), and other alloys thereof.

Moreover, in the exemplary embodiment, buffering circuit 250 is defined on a substrate 260 formed of AlN. Alternatively, any wide bandgap semiconductor material is used to form substrate 260 including, without limitation, GaN, SiC, InN, and other alloys thereof. Also, in the exemplary embodiment, buffering circuit 250 is one of a voltage-mode amplifier circuit and a charge-mode amplifier circuit. Alternatively, any circuit configuration is used that enables operation of buffering circuit 250 and sensor assembly 200 as described herein. Further, in the exemplary embodiment, buffering circuit 250 includes a robust circuit architecture that enables operation of sensor assembly 200 in environmental conditions in a range of approximately −55° C. (−67° F.) to approximately 600° C. (1112° F.) substantially continuously, i.e., for exposure periods over an extended period of time, e.g., exceeding approximately 5,000 hours. In the exemplary embodiment, examples of high-temperature apparatus that may generate such high-temperature conditions include, without limitation, gas turbines, steam turbines, gasification facilities, heat recovery steam generators, and heat exchangers (none shown). Alternatively, such apparatus may include, without limitation, tools and equipment for exploration of deep oil wells.

Figure 4:
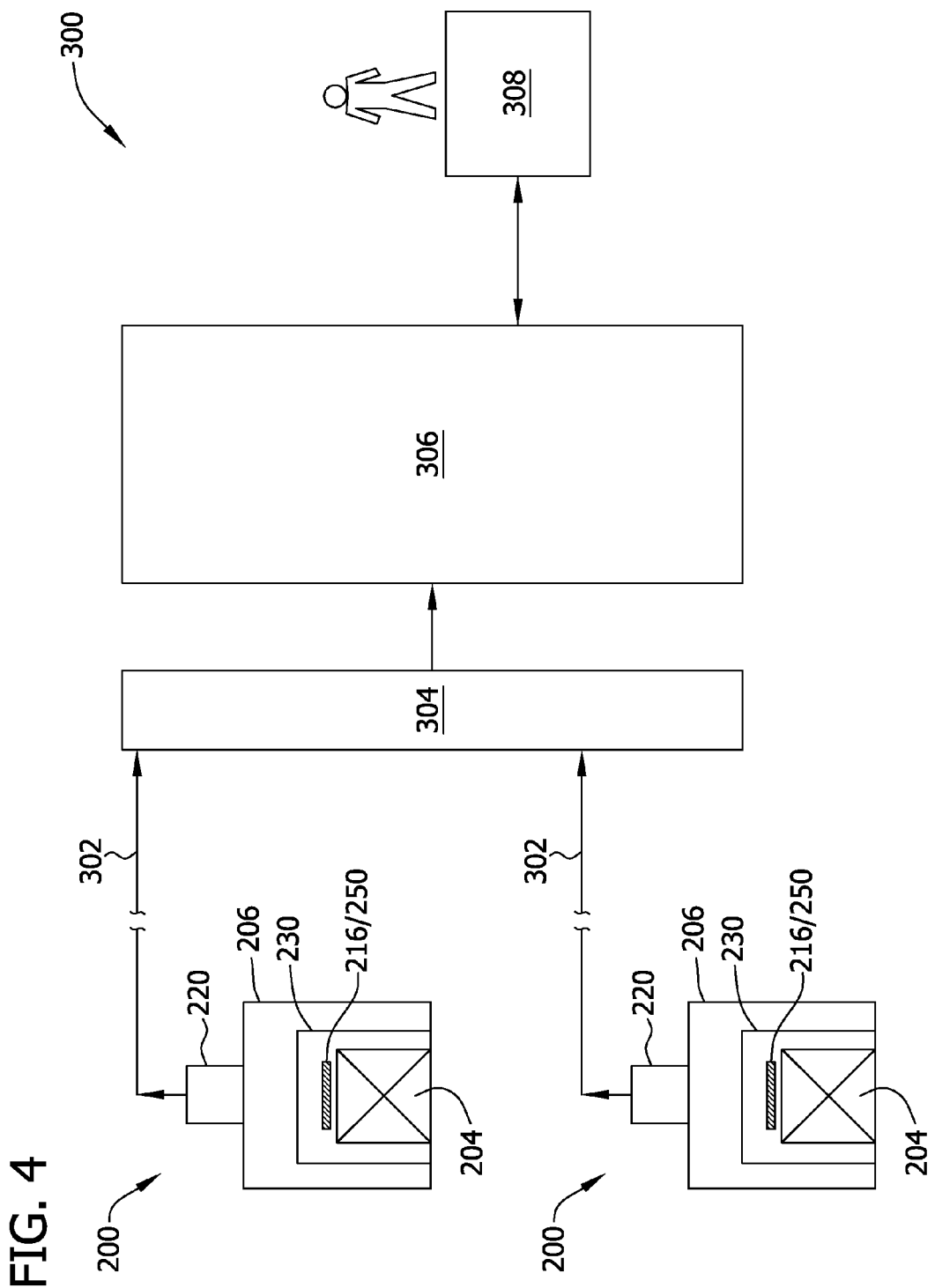
FIG. 4 is a schematic view of an exemplary data acquisition system (DAS) that may use the sensor assembly shown in FIG. 2.

FIG. 4 is a schematic view of an exemplary data acquisition system (DAS) 300 that may use a plurality of sensor assemblies 200. In the exemplary embodiment, DAS 300 is a stand-alone data storage and display system. In some embodiments, DAS 300 is a part of a large system, for example, without limitation, a Supervisory Control and Data Acquisition (SCADA) system. Also, in the exemplary embodiment, DAS 300 includes a data cable 302 that is a standard cable that is less expensive, and more flexible than MI cable 120 (shown in FIG. 1). Therefore, use of MI cable is substantially eliminated. Data cable 302 is coupled to connector section 220 of sensor assembly 200. Further, in the exemplary embodiment, DAS 300 includes at least one input/output (I/O) terminal strip 304 (only one shown in FIG. 3) operatively coupled to each of sensor assemblies 200 via data cables 302. Moreover, in the exemplary embodiment, DAS 300 includes at least one DAS cabinet 306 operatively coupled to each I/O terminal strip 304. DAS cabinet 306 includes sufficient processing and information display features (not shown) to enable DAS 300 as described herein. Also, in the exemplary embodiment, DAS 300 includes an operator station 308 operatively coupled to DAS cabinet 306.

FIG. 5 is a flowchart of an exemplary method 400 of assembling sensor assembly 200 (shown in FIG. 2). In the exemplary embodiment, at least one high-impedance sensing device, or sensor 204 (shown in FIG. 2) is positioned 402 within outer housing 206 (shown in FIG. 2). Buffering circuit 250 (shown in FIG. 3) is fabricated 404, such fabrication 404 includes providing a wide bandgap semiconductor substrate 260 (shown in FIG. 3) and defining at least one wide bandgap semiconductor device, e.g., operational amplifier 256 thereon. Also, in the exemplary embodiment, buffering circuit 250 is positioned 406 within outer housing 206. Further, in the exemplary embodiment, buffering circuit 250 is operatively coupled 408 to or sensor 204.

Described herein are exemplary embodiments of sensor assemblies that facilitate improved industrial and commercial operation over that of known sensor assemblies. The above-described methods and apparatus facilitate operation of sensor assemblies in rugged, high-temperature environments, up to, and exceeding, approximately 225° C. (437° F.). Specifically, survivability and proper operation of the sensor assemblies described herein is extended to temperatures up to, and including, approximately 600° C. (1112° F.) in contrast to known sensor assemblies that may only be used in temperatures not to exceed approximately 125° C. (257° F.). Moreover, the associated exposure periods for the sensor assemblies described herein may extend substantially continuously beyond 5,000 hours. Such methods and apparatus also facilitate elimination of MI cable and auxiliary cooling systems, thereby decreasing a cost of manufacturing, assembling, and installing the sensor assemblies. Moreover, in contrast to known sensor assemblies, the increased robustness of the sensor assemblies as described herein facilitate installation of sensor devices in areas previously inaccessible due to the harsh, high temperature environment and the limitations of known sensor assemblies. Furthermore, in contrast to known sensor assemblies, the sensor assemblies described herein facilitate operating with a desired signal-to-noise ratio (SNR). Specifically, the use of high-impedance sensor devices, positioning such sensor devices proximate to the conditioning electronics, and enclosing the sensors and electronics in EMI shielding improves the SNR over that associated with known sensor assemblies.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the invention has been described in terms of various specific embodiments, those skilled in the art will recognize that the invention can be practiced with modification within the spirit and scope of the claims.

What is claimed is:

1. A sensor assembly comprising:
   an outer housing;
   at least one high-impedance sensing device positioned within the outer housing; and
   a buffering circuit comprising at least one wide bandgap semiconductor operational amplifier positioned within the outer housing, the buffering circuit operatively coupled to the at least one high-impedance sensing device, wherein the sensor assembly itself is operable for extended periods in an environment with temperatures greater than approximately 225 degrees Celsius (° C.).

2. The sensor assembly in accordance with claim 1, wherein:
   the sensor assembly further comprises electromagnetic interference (EMI) shielding extending about at least a portion of the at least one high-impedance sensing device and the buffering circuit; and
   the sensor assembly does not comprise mineral insulated (MI) cable.

3. The sensor assembly in accordance with claim 1, wherein the sensor assembly does not comprise an auxiliary cooling system.

4. The sensor assembly in accordance with claim 1, wherein the at least one wide bandgap semiconductor operational amplifier comprises a substrate comprising at least one of silicon carbide (SiC), gallium nitride (GaN), aluminum nitride (AlN), and indium nitride (InN).

5. The sensor assembly in accordance with claim 1, wherein the buffering circuit further comprises a wide bandgap semiconductor substrate.

6. The sensor assembly in accordance with claim 1, wherein the at least one high-impedance sensing device is one of a piezoelectric device and a photodiode device.

7. A method for assembling a sensor assembly, the method comprising:
   positioning at least one high-impedance sensing device within a housing;
   fabricating a buffering circuit comprising providing a wide bandgap semiconductor substrate and defining at least one wide bandgap semiconductor operational amplifier thereon;
   positioning the buffering circuit within the housing; and
   operatively coupling the buffering circuit to the at least one high-impedance sensing device, wherein operatively coupling the buffering circuit comprises assembling the sensor assembly such that the sensor assembly itself is operable substantially continuously in an environment with temperatures greater than approximately 225 degrees Celsius (° C.).

8. The method in accordance with claim 7, wherein the sensor assembly excludes both a mineral insulated (MI) cable and an auxiliary cooling system.

9. The method in accordance with claim 7, wherein the at least one wide band gap semiconductor operational amplifier comprises the wide bandgap semiconductor substrate, and the wideband gap semiconductor substrate comprises a substrate formed from one of silicon carbide (SiC), gallium nitride (GaN), aluminum nitride (AlN), and indium nitride (InN).

10. The method in accordance with claim 7, wherein positioning at least one high-impedance sensing device comprises providing one of a piezoelectric device and a photodiode device.

11. The method in accordance with claim 7, further comprising extending electromagnetic interference (EMI) shielding about at least a portion of the at least one high-impedance sensing device and the buffering circuit.

12. A data acquisition system (DAS) comprising:
   at least one DAS cabinet;
   at least one input/output (I/O) terminal strip coupled in communication with the at least one DAS cabinet;
   a plurality of sensor assemblies operatively coupled to the DAS cabinet via the at least one I/O terminal strip, each sensor assembly of the plurality of sensor assemblies comprising:
      an outer housing;
      at least one high-impedance sensing device positioned within the outer housing; and
      a buffering circuit comprising at least one wide bandgap semiconductor operational amplifier positioned within the outer housing, the buffering circuit operatively coupled to the at least one high-impedance sensing device, wherein each sensor assembly of the plurality of sensor assemblies is itself operable for extended periods in an environment with temperatures greater than approximately 225 degrees Celsius (° C.).

13. The DAS in accordance with claim 12, wherein:
the sensor assembly further comprises electromagnetic interference (EMI) shielding extending about at least a portion of the at least one high-impedance sensing device and the buffering circuit; and
the sensor assembly does not comprise mineral insulated (MI) cable.

14. The DAS in accordance with claim 12, wherein the sensor assembly of the DAS does not comprise an auxiliary cooling system.

15. The DAS in accordance with claim 12, wherein the at least one wide bandgap semiconductor operational amplifier comprises a substrate comprising at least one of silicon carbide (SiC), gallium nitride (GaN), aluminum nitride (AlN), and indium nitride (InN).

16. The DAS in accordance with claim 12, wherein the buffering circuit further comprises a wide bandgap semiconductor substrate.

17. The DAS in accordance with claim 12, wherein the at least one high-impedance sensing device is one of a piezoelectric device and a photodiode device.

* * * * *